United States Patent
Koo et al.

(10) Patent No.: US 9,667,756 B2
(45) Date of Patent: May 30, 2017

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Kijong Koo, Daejeon (KR); Doyoung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 331 days.

(21) Appl. No.: 13/909,801

(22) Filed: Jun. 4, 2013

(65) Prior Publication Data
US 2013/0322468 A1 Dec. 5, 2013

(30) Foreign Application Priority Data

Jun. 5, 2012 (KR) .................. 10-2012-0060554
Jun. 22, 2012 (KR) .................. 10-2012-0067560

(51) Int. Cl.
*H04L 25/03* (2006.01)
*H04L 29/06* (2006.01)
*H04L 29/08* (2006.01)
*H04L 1/00* (2006.01)
*H04L 1/08* (2006.01)

(52) U.S. Cl.
CPC ............ *H04L 69/22* (2013.01); *H04L 1/0013* (2013.01); *H04L 1/0026* (2013.01); *H04L 1/08* (2013.01); *H04L 69/324* (2013.01)

(58) Field of Classification Search
None
See application file for complete search history.

(56) References Cited

U.S. PATENT DOCUMENTS

| 5,870,412 | A | * | 2/1999 | Schuster et al. | 714/752 |
|---|---|---|---|---|---|
| 7,159,235 | B2 | | 1/2007 | Son et al. | |
| 2004/0095950 | A1 | * | 5/2004 | Shirogane et al. | 370/428 |
| 2005/0111371 | A1 | * | 5/2005 | Miura | H04L 1/1819 370/242 |
| 2007/0300134 | A1 | * | 12/2007 | Sugai et al. | 714/776 |

(Continued)

FOREIGN PATENT DOCUMENTS

| KR | 10-2001-0038203 A | 5/2001 |
|---|---|---|
| KR | 10-2008-0102934 | 11/2008 |

(Continued)

*Primary Examiner* — Fan Ng
(74) *Attorney, Agent, or Firm* — Kile Park Reed & Houtteman PLLC

(57) ABSTRACT

An apparatus for transmitting data in a communication system includes: a receiving unit configured to receive reception information of a data packet in a receiver from the receiver; a frame generation unit configured to generate a plurality of frames containing data to transmit to the receiver, in consideration of the reception information; a packet generation unit configured to include the plurality of frames into a payload and generate a data packet; and a transmitting unit configured to transmit the generated data packet to the receiver, wherein the payload includes a mode field containing information on the plurality of frames and the plurality of frames.

14 Claims, 5 Drawing Sheets

| Header (100) | Mode (155) | Main Frame (160) | Redundancy Frame (165) | XOR Frame (170) |
|---|---|---|---|---|

Payload(150)

(56) References Cited

U.S. PATENT DOCUMENTS

| | | | |
|---|---|---|---|
| 2008/0225735 A1* | 9/2008 | Qiu | H04L 1/0009 370/252 |
| 2010/0061287 A1* | 3/2010 | Josiam | H03M 13/6306 370/312 |
| 2010/0138724 A1* | 6/2010 | Fogel | H04L 1/0084 714/774 |
| 2010/0166006 A1* | 7/2010 | Xu | 370/401 |
| 2010/0246602 A1* | 9/2010 | Barreto et al. | 370/466 |
| 2011/0064031 A1* | 3/2011 | Elmasry | 370/328 |
| 2012/0005549 A1* | 1/2012 | Ichiki et al. | 714/748 |
| 2014/0010242 A1 | 1/2014 | Koo et al. | |

FOREIGN PATENT DOCUMENTS

| | | |
|---|---|---|
| KR | 10-2011-0091900 | 8/2011 |
| WO | 2008/143473 | 11/2008 |
| WO | 2010/063317 | 6/2010 |

\* cited by examiner

APPARATUS AND METHOD FOR TRANSMITTING/RECEIVING DATA IN COMMUNICATION SYSTEM

CROSS-REFERENCES TO RELATED APPLICATIONS

The present application claims priority of Korean Patent Application Nos. 10-2012-0060554 and 10-2012-0067560, filed on Jun. 5, 2012, and Jun. 22, 2012, respectively, which are incorporated herein by reference in their entirety.

BACKGROUND OF THE INVENTION

Field of the Invention

Exemplary embodiments of the present invention relate to a communication system; and, more particularly, to an apparatus and method which recovers a loss of a data packet to improve a multimedia service quality in an all-Internet protocol (hereafter, referred to as 'IP') network based on wireless communication, thereby normally transmitting and receiving data.

Description of Related Art

In a current communication system, research has been actively conducted to provide various qualities of service (hereafter, referred to as 'QoS') of services having a high transmission rate to users. Examples of the communication system may include a wireless local area network (hereafter, referred to as 'WLAN') system. With the development of mobile communication technology and the emergence of smart phones, it has been made possible to provide various multimedia services such as Internet access, mails, voice, and images through a terminal using a packet network.

Furthermore, in a communication system to provide a multimedia service through a terminal, it has been made possible to provide various real-time multimedia services due to the enhancement of networks, for example, the expansion of network bandwidths, the improvement in transmission speed of the networks, and the improvement of terminal performance. However, due to the increase in the number of users intended to receive multimedia services, the increase in data amount based on the improvement in quality of voice and image data, and the fundamental cause of the IP network in which the QoS is not guaranteed, a delay and loss of transmitted data still occurs even in the enhanced network.

Furthermore, the delay and loss in the real-time multimedia service may degrade the quality of multimedia services which are to be provided to users. Accordingly, various methods for minimizing a data loss serving as the largest factor of the degradation of QoS have been proposed. For example, a loss recovery method using a forward error correction code, a transmission control method through quality or loss feedback, a congestion avoidance method and the like have been proposed. However, the proposed methods have limitations in data recovery performance and speed when recovering lost data in a communication system transmitting/receiving large-volume data to provide multimedia services.

Therefore, there is a demand for a method which is capable of recovering lost data and normally transmitting and receiving data at high speed, in order to improve the quality of multimedia services in a communication system to provide the multimedia services.

SUMMARY OF THE INVENTION

An embodiment of the present invention is directed to an apparatus and method for transmitting and receiving data in a communication system.

Another embodiment of the present invention is directed to an apparatus and method which is capable of recovering a loss of a data packet to improve a multimedia service quality in a communication system, thereby normally transmitting and receiving data at high speed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting data in a communication system includes: a receiving unit configured to receive reception information of a data packet in a receiver from the receiver; a frame generation unit configured to generate a plurality of frames containing data to transmit to the receiver, in consideration of the reception information; a packet generation unit configured to include the plurality of frames into a payload and generate a data packet; and a transmitting unit configured to transmit the generated data packet to the receiver, wherein the payload includes a mode field containing information on the plurality of frames and the plurality of frames.

In accordance with another embodiment of the present invention, an apparatus for receiving data in a communication system includes: a receiving unit configured to receive a data packet from a transmitter; a check unit configured to check control information contained in a header of the data packet and information on a plurality of frames included in a payload of the data packet; a decoder configured to decode the plurality of frames included in the payload; a recovery unit configured to recover data transmitted by the transmitter through the decoded frames; and a transmitting unit configured to transmit reception information of the data packet to the transmitter, wherein the payload includes a mode field containing information on the plurality of frames and the plurality of frames.

In accordance with another embodiment of the present invention, a method for transmitting/receiving data in a communication system includes: receiving reception information of a data packet in a receiver from the receiver; generating a plurality of frames containing data to transmit to the receiver by considering the reception information and then including the plurality of frames into a payload to generate a data packet including a header and the payload; and transmitting the generated data packet to the receiver, wherein the payload includes a mode field containing information on the plurality of frames and the plurality of frames, and the mode field includes the reception information and information indicating the number of frames.

DESCRIPTION OF SPECIFIC EMBODIMENTS

Figure 1:
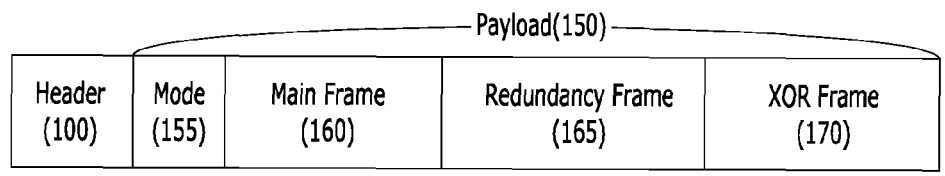
FIG. 1 is a diagram schematically illustrating a data packet structure in a communication system in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The exemplary embodiments of the present invention provide an apparatus and method for transmitting/receiving data in a communication system, for example, a communication system to provide a multimedia service. In the embodiments of the present invention, a communication system including an all-IP network based on wireless communication, for example, a WLAN system will be taken as an example for description. However, the apparatus and method for transmitting/receiving data in accordance with the embodiments of the present invention may be applied to other communication systems.

Furthermore, the apparatus and method for transmitting/receiving data in accordance with the embodiments of the present invention may recover a loss of a data packet which occurs when multimedia service data for providing a multimedia service are transmitted/received in a communication system to provide the multimedia service, thereby normally transmitting/receiving large-volume data at high speed. In the embodiments of the present invention, the apparatus and method transmits/receives a plurality of frames containing data corresponding to the multimedia service as one data packet. In particular, the apparatus and method transmits/receives a main frame of data corresponding to the multimedia service and a redundancy frame of the main frame as one data packet. At this time, the apparatus and method checks reception information of the data packet so as to add an exclusive OR (XOR) frame of the main frame to the data packet. Accordingly, the apparatus and method generates the main frame, the redundancy frame, and the XOR frame as one data packet and then transmits/receives the data packet.

Furthermore, when a communication system provides a real-time multimedia service, the apparatus and method for transmitting/receiving data in accordance with the embodiment of the present invention recovers a loss of a data packet which occurs when the real-time multimedia service is transmitted/received, thereby normally transmitting/receiving large-volume data at high speed. At this time, the apparatus and method transmits/receives a plurality of frames containing data corresponding to the real-time multimedia service as one data packet, for example, a real-time transport protocol (hereafter, referred to as 'RTP') packet. That is, the apparatus and method transmits/receives a main frame of data corresponding to the real-time multimedia service and a redundancy frame as one RTP packet. At this time, the apparatus and method checks reception information of the RTP packet, generates the main frame, the redundancy frame, and an XOR frame as one RTP packet, and then transmits/receives the RTP packet. Now, referring to FIG. 1, a data packet transmitted/received by an apparatus for transmitting/receiving data in a communication in accordance with an embodiment of the present invention will be described in detail.

FIG. 1 is a diagram schematically illustrating a data packet structure in the communication system in accordance with the embodiment of the present invention. FIG. 1 schematically illustrates the structure of an RTP packet including a plurality of frames containing data corresponding to a real-time multimedia service.

Referring to FIG. 1, the data packet includes a header 100 and a payload 150. The header 100 contains control information on the data packet, and the payload 150 contains data corresponding to a multimedia service. The header 100 of the data packet contains all control information required when a receiver receiving the data packet recovers data of the multimedia service contained in the payload 150 of the data packet.

Furthermore, the payload 150 of the data packet includes the plurality of frames, when the plurality of frames containing data corresponding to the multimedia service are transmitted/received as one data packet as described above. In particular, the payload 150 of the data packet includes a main frame 160 of the data corresponding to the multimedia service and a redundancy frame 165 of the main frame 160. Furthermore, the payload 150 includes an XOR frame 170 of the main frame 160 depending on reception information of the data packet received from the receiver. Furthermore, the payload 150 of the data packet includes a mode field 155 containing information of the frames included in the payload 150 of the data packet. That is, the mode field 155 contains information indicating the number of frames included in the payload 150 as field information.

For example, a transmitter to transmit the data packet receives reception information of the data packet from a receiver and checks the reception information. Then, the transmitter includes the main frame 160 and the redundancy frame 165 into the payload 150 or includes the main frame 160, the redundancy frame 165, and the XOR frame 170 into the payload 150, and includes information on frames included in the payload 150, for example, information on the number of frames included in the payload 150 into the mode field 155. The reception information of the data packet contains data packet loss information of the receiver on a data packet received by the receiver, that is, a loss ratio. When the receiver transmits the data packet as illustrated in FIG. 1 to the transmitter, the loss ratio is contained into the mode field 155 and then transmitted to the transmitter. That is, the mode field 155 contains not only information on the number of frames included in the payload 150 as field information, but also reception information of a data packet received from the receiver, that is, loss information when the transmitter to transmit a data packet including the mode field 155 receives the data packet from the receiver.

Furthermore, the transmitter checks the reception information contained in the mode field 155 of the data packet received from the receiver. When a loss ratio of the data packet in the receiver is smaller than a threshold value, the transmitter includes the main frame 160 and the redundancy frame 165 into the payload 150 and then transmits the data packet to the receiver. When the loss ratio of the data packet is larger than the threshold value, the transmitter includes the main frame 160, the redundancy frame 165, and the XOR frame 170 into the payload 150 and then transmits the data packet to the receiver. At this time, the mode field 155 contains information on the number of frames included in the payload 150 and the reception information of the data packet in the transmitter, that is, loss information.

Furthermore, the receiver checks control information contained in the header 100 of the data packet, and recovers data corresponding to the multimedia service contained in the payload 150. At this time, the receiver checks the size of the payload 150 through the header 100, and checks the number of frames included in the payload 150 through the mode field 155. Therefore, the receiver checks the lengths of the frames included in the payload 150 through the size of the payload 150 and the number of frames. Here, the frames included in the payload 150 have the same size. The receiver receiving the data packet includes a plurality of frames containing data, which are to be transmitted to the transmitter, into the payload 150 and then transmits the frames as one data packet. At this time, the information on the number of frames included in the payload 150 and the reception information of the data packet in the receiver, that is, loss information are contained into the mode field 155 and then transmitted. Now, referring to FIG. 2, a plurality of frames included in a payload of a data packet transmitted/received by the apparatus for transmitting/receiving data in a communication system in accordance with the embodiment of the present invention will be described in detail.

Figure 2:
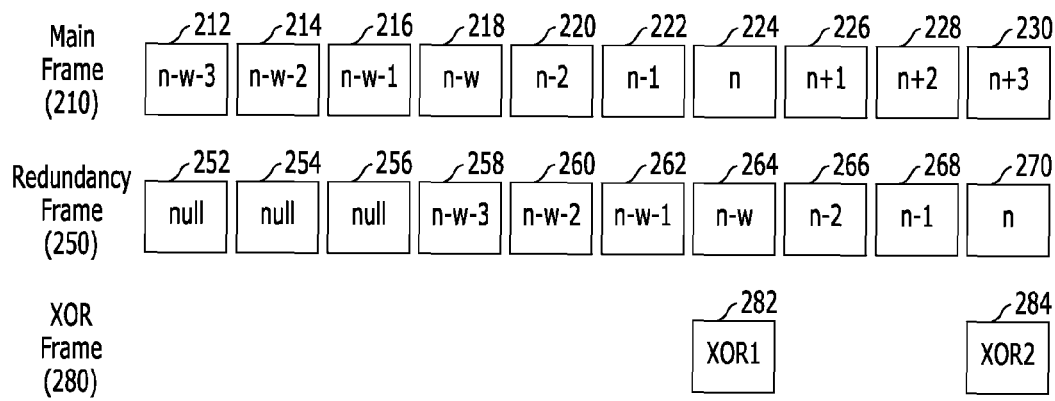
FIG. 2 is a diagram schematically illustrating the structures of frames of a data packet in the communication system in accordance with the embodiment of the present invention.

FIG. 2 is a diagram schematically illustrating the structures of frames of a data packet in the communication system in accordance with the embodiment of the present invention. FIG. 2 schematically illustrates the structures of a main frame, a redundancy frame, and an XOR frame included in a payload of the data packet.

Referring to FIG. 2, when a transmitter in the communication system, for example, a terminal transmits data corresponding to a multimedia service as a frame having a sequence number, that is, when the transmitter transmits a data packet frame having a sequence number n (=7), for example, a voice frame or video frame, the transmitter checks reception information of the data packet in a receiver, and then transmits a plurality of frames containing data corresponding to the multimedia service as one data packet.

That is, when a loss ratio of the data packet in the receiver is smaller than a threshold value as described above, the transmitter includes a main frame 210 and a redundancy frame 250 into a payload of the data packet and then transmits the frames as one data packet. When the loss ratio of the data packet in the receiver is larger than the threshold value, the transmitter includes the main frame 210, the redundancy frame 250, and an XOR frame 280 into the payload and then transmits the frames as one data packet. At this time, the mode field of the payload contains information on the number of frames included in the payload and the reception information of the data packet in the transmitter, that is, loss information.

More specifically, the main frame 210 includes a plurality of sequence frames having an arbitrary sequence number. For example, the main frame includes an (n−w−3)(=1)-th sequence frame 212, an (n−w−2)(=2)-th sequence frame 214, an (n−w−1)(=3)-th sequence frame 216, an (n−w)(=4)-th sequence frame 218, an (n−2)(=5)-th sequence frame 220, an (n−1)(=6)-th sequence frame 222, an n(=7)-th sequence frame 224, an (n+1)(=8)-th sequence frame 226, an (n+2)(=9)-th sequence frame 228, and an (n+3)(=10)-th sequence frame 230.

Here, n (=1, 2, 3, . . . ) represents sequence numbers of frames containing data which are sequentially generated for a real-time multimedia service when the communication system provides the real-time multimedia service. In this embodiment of the present invention, suppose that n is 7 (n=7), for convenience of description.

Furthermore, w (=1, 2, 3, . . . ) represents a sequence delay value between the main frame 210 and the redundancy frame 250, and is decided in response to reception information of a data packet in the receiver, which is received through a mode field. In order to improve recovery performance for a data packet lost when the data packet is transmitted/received, w is decided according to a loss ratio of the data packet in the receiver. For example, when the loss ratio of the data packet in the receiver is smaller than a threshold value, w is decided as a smaller value than w which was decided when a previous data packet is transmitted/received. When the loss ratio of the data packet in the receiver is larger than the threshold value, w is decided as a larger value than w which was decided when the previous data packet is transmitted/received.

Here, w is transmitted to the receiver through the mode field of the payload. The receiver checks the size of the payload, the number of frames, and the lengths of the frames through the information contained in the header of the data packet and the mode field of the pay load. In particular, the receiver recognizes start points of the frames in the payload through w, and decodes the respective frames. That is, the receiver recognizes the start point of the main frame, the start point of the redundancy frame, and the start point of the XOR frame in the payload of the data packet through the size of the payload, the number of frames, the lengths of the frames, and w, and normally decodes the main frame, the redundancy frame, and the XOR frame so as to recover a lost data packet. Accordingly, the receiver normally recovers the data transmitted by the transmitter.

The redundancy frame 250 includes a plurality of sequence frames having a sequence delay value of the main frame 210 having an arbitrary sequence number, that is, w (=3). For example, the redundancy frame 250 includes an (n−w−3)(=1)-th sequence frame 258, an (n−w−2)(=2)-th sequence frame 260, an (n−w−1)(=3)-th sequence frame 262, an (n−w)(=4)-th sequence frame 264, an (n−2)(=5)-th sequence frame 266, an (n−1)(=6)-th sequence frame 268, and an n(=7)-th sequence frame 270. Furthermore, the redundancy frame 250 includes null frames 252, 254, and 256 corresponding to the (n−w−3)(=1)-th sequence frame 212, the (n−w−2)(=2)-th sequence frame 214, and the (n−w−1)(=3)-th sequence frame 216 in the main frame 210, respectively. That is, since the redundancy frame 250 has a sequence delay value w(=3), the sequence frames of the main frame 210 exist after the w(=3)-th sequence frame of the main frame 210.

The XOR frame 280 includes frames obtained by performing an XOR operation on the main frame 210 having an arbitrary sequence number. For example, the XOR frame 280 includes an XOR1 frame 282 obtained by performing an XOR operation on the (n−w−3)(=1)-th sequence frame 212, the (n−w−2)(=2)-th sequence frame 214, and the (n−w−1)(=3)-th sequence frame 216 of the main frame 210 and an XOR2 frame 284 obtained by performing an XOR operation on the (n−w) (=4)-th sequence frame 218, the (n−2)(=5)-th sequence frame 220, and the (n−1)(=6)-th sequence frame 222 of the main frame 210.

Therefore, when the transmitter transmits a data packet having a sequence number n(=7), the transmitter includes the n(=7)-th sequence frame 224 of the main frame 210, the (n−w)(=4)-th sequence frame 264 of the redundancy frame 250, and the XOR1 frame 282 of the XOR frame 280 into the payload of the data packet, thereby constructing one data packet. At this time, the mode field of the payload contains information indicating that the above-described three frames are included in the payload, that is, information on the number of frames. When the transmitter transmits the n-th data packet frame, the transmitter generates the main frame 210 of the n(=7)-th sequence frame 224, the redundancy frame 250 of the (n−w)(=4)-th sequence frame 264, and a result obtained by performing an XOR operation on the (n−w−3)(=1)-th sequence frame 212, the (n−w−2)(=2)-th sequence frame 214, and the (n−w−1)(=3)-th sequence frame 216 of the main frame 210, that is, the XOR frame 280 of the XOR1 frame 282 as one data packet and then transmits the data packet.

Furthermore, when the transmitter transmits a data packet having a sequence number (n+1)(=8), the transmitter includes the (n+1)(=8)-th sequence frame 226 of the main frame 210 and the (n−2)(=5)-th sequence frame 266 of the redundancy frame 250 into the payload of the data packet, thereby constructing one data packet. At this time, the mode field of the payload contains information indicating that the above-described two frames are included in the payload, that is, information on the number of frames. When the transmitter transmits an (n+1)-th data packet frame, the transmitter generates the main frame 210 of the (n+1)(=8)-th sequence frame 226 and the redundancy frame 250 of the (n−2)(=5)-th sequence frame 266 as one data packet and then transmits the data packet.

Furthermore, when the transmitter transmits a data packet frame having a sequence number (n+2)(=9), the transmitter includes the (n+2)(=9)-th sequence frame 228 of the main frame 210 and the (n−1)(=6)-th sequence frame 268 of the redundancy frame 250 into the payload of the data packet, thereby constructing one data packet. At this time, the mode field of the payload contains information indicating that the above-described two frames are included in the payload, that is, information on the number of frames. When the transmitter transmits an (n+2)-th data packet frame, the transmitter generates the main frame 210 of the (n+2)(=9)-th sequence frame 228 and the redundancy frame 250 of the (n−1)(=6)-th sequence frame 268 as one data packet and then transmits the data packet.

Furthermore, when the transmitter transmits a data packet frame having a sequence number (n+3)(=10), the transmitter includes the (n+3)(=10)-th sequence frame 230 of the main frame 210, the n(=7)-th sequence frame 270 of the redundancy frame 250, and the XOR2 frame 284 of the XOR frame 280 into the payload of the data packet, thereby constructing one data packet. At this time, the mode field of the payload contains information indicating that the above-described three frames are included in the payload, that is, information on the number of frames. When the transmitter transmits an (n+3)-th data packet frame, the transmitter generates the main frame 210 of the (n+3)(=10)-th sequence frame 230, the redundancy frame 250 of the n(=7)-th sequence frame 270, and a result obtained by performing an XOR operation on the (n−w)(=4)-th sequence frame 218, the (n−2)(=5)-th sequence frame 220, and the (n−1)(=6)-th sequence frame 222 of the main frame 210, that is, the XOR frame 280 of the XOR2 frame 284 as one data packet, and then transmits the data packet.

In this way, when the transmitter includes the main frame 210 and the redundancy frame 250 into the payload and transmits the data packet or includes the main frame 210, the redundancy frame 250, and the XOR frame 280 into the payload and transmits the data packet, the receiver checks the frames included in the payload and receives data corresponding to the multimedia service transmitted by the transmitter. Here, the transmitter checks the control information on the payload through the header of the data packet as described above, and checks the information on the number of frames, contained in the mode field of the payload.

The receiver decodes the main frame 210 included in the payload so as to recover the data transmitted from the transmitter. At this time, when a predetermined sequence frame is lost in the decoded main frame, the receiver recovers the lost sequence frame, that is, the lost data packet through the redundancy frame, thereby recovering the data transmitted from the transmitter. Furthermore, when the sequence frame lost in the main frame is also lost in the redundancy frame, the receiver recovers the sequence frame lost in the main frame and the redundancy frame through the XOR frame, thereby recovering the data transmitted from the transmitter.

More specifically, the receiver decodes the main frame 210 included in the payload so as to recover the data transmitted from the transmitter. As a result, when the (n−w−3)(=1)-th sequence frame 212 of the main frame 210 was lost, the receiver decodes the redundancy frame 250 to check the (n−w−3)(=1)-th sequence frame 258 of the redundancy frame 250, and recovers the lost (n−w−3)(=1)-th sequence frame 212 of the main frame 210 from the (n−w−3)(=1)-th sequence frame 258 of the redundancy frame 250, thereby recovering the data transmitted from the transmitter. At this time, when the (n−w−3)(=1)-th sequence frame 258 of the redundancy frame 250 as well as the (n−w−3)(=1)-th sequence frame 212 of the main frame 210 was lost, the receiver decodes the XOR frame 280 to check the XOR1 frame 282 of the XOR frame 280, and recovers the lost (n−w−3)(=1)-th sequence frame 212 of the main frame 210 through the XOR1 frame 282 obtained by performing an XOR operation on the (n−w−3)(=1)-th sequence frame 212, the (n−w−2)(=2)-th sequence frame 214, and the (n−w−1)(=3)-th sequence frame 216 of the main frame 210, thereby recovering the data transmitted from the transmitter. Here, the lost (n−w−3)(=1)-th sequence frame 212 of the main frame 210 is recovered by performing an XOR operation on the (n−w−2)(=2)-th sequence frame 214 and the (n−w−1)(=3)-th sequence frame 216 of the main frame 210 and the XOR1 frame 282.

Furthermore, the decoded main frame 210 is inputted to a jitter buffer of a recovery unit included in the receiver, and the decoded redundancy frame 250 and the decoded XOR frame 280 are inputted to a recovery buffer of the recovery unit. As described above, a sequence frame lost in the decoded mainframe 210 is recovered through the decoded redundancy frame 250 or the decoded XOR frame 280 such that the transmitted data contained in the payload are normally recovered. Furthermore, the receiver includes the reception information of the data packet corresponding to the loss of the data packet and the recovery of the lost data packet, that is, the loss information of the data packet into the mode field included in the payload of the data packet which is to be transmitted to the transmitter, and then transmits the data packet to the transmitter. Now, referring to FIG. 3, the apparatus for transmitting the above-described data packet in the communication system in accordance with the embodiment of the present invention will be described in more detail.

Figure 3:
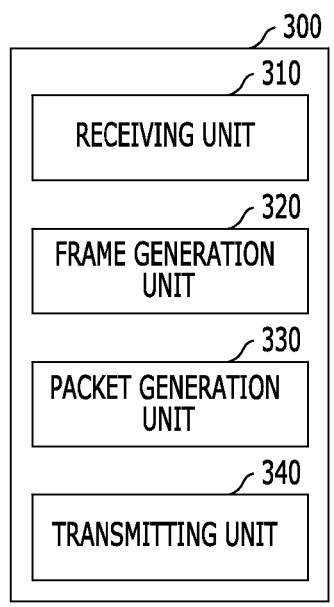
FIG. 3 is a diagram schematically illustrating the structure of a transmitter in the communication system in accordance with the embodiment of the present invention.

FIG. 3 is a diagram schematically illustrating the structure of a transmitter in the communication system in accordance with the embodiment of the present invention. FIG. 3 schematically illustrates an apparatus that includes data corresponding to a multimedia service into a plurality of frames and transmits the plurality of frames as one data packet, as described with reference to FIGS. 1 and 2.

Referring to FIG. 3, the transmitter 300 includes a receiving unit 310, a frame generation unit 320, a packet generation unit 330, and a transmitting unit 340. The receiving unit 310 is configured to receive a data packet transmitted from a receiver and reception information of a data packet in the receiver from the receiver. The frame generation unit 320 is configured to check the reception information and generate a plurality of frames which are to be included in a payload of the data packet. The packet generation unit 330 is configured to include the generated frames into the payload and generate one data packet. The transmitting unit 340 is configured to transmit the generated data packet to the receiver.

More specifically, the receiving unit 310 receives a data packet from the receiver, and receives reception information of a data packet in the receiver through a mode field contained in a payload of the received data packet, that is, loss information of the data packet.

The frame generation unit 320 generates data to transmit to the receiver, that is, a plurality of frames containing data corresponding to the multimedia service. At this time, the frame generation unit 320 decides the number of frames and w by considering the loss information of the data packet in the receiver. According to the decided frame number and w, the frame generation unit 320 generates a main frame and a redundancy frame, or generates an XOR frame as wells as the main frame and the redundancy frame.

The packet generation unit 330 includes the plurality of frames generated by the frame generation unit 320 into a payload and generates a data packet. At this time, the packet generation unit 330 contains the information on the frames included in the payload, or particularly, information indicating the number of frames into the mode field of the payload. The payload of the data packet includes the main frame and the redundancy frame or the main frame, the redundancy frame, and the XOR frame, depending on the loss information of the data packet in the receiver.

Furthermore, the transmitting unit 340 transmits the data packet generated by the packet generation unit 330 to the receiver. Since the structure of the data packet transmitted to the receiver, the structures of the frames included in the payload of the data packet, that is, the main frame, the redundancy frame, and the XOR frame, and the operation of the transmitter 300 to generate and transmit the plurality of frames and the data packet have been described in detail with reference to FIGS. 1 and 2, the detailed descriptions thereof are omitted herein. Now, referring to FIG. 4, the apparatus for receiving the above-described data packet in the communication system in accordance with the embodiment of the present invention will be described in detail.

Figure 4:
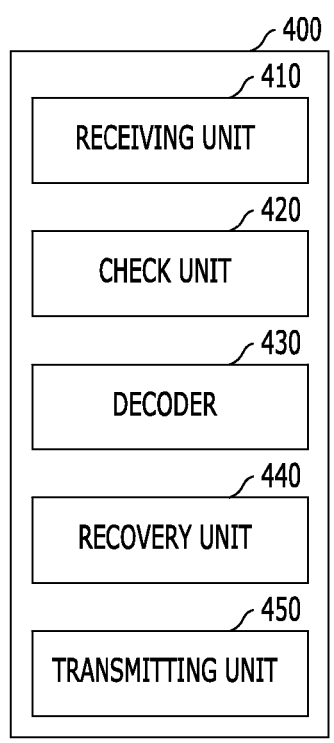
FIG. 4 is a diagram schematically illustrating the structure of a receiver in the communication system in accordance with the embodiment of the present invention.

FIG. 4 is a diagram schematically illustrating the structure of a receiver in the communication system in accordance with the embodiment of the present invention. FIG. 4 schematically illustrates an apparatus that receives a data packet when data corresponding to a multimedia service are contained in a plurality of frames and then transmitted as the data packet, as described with reference to FIGS. 1 and 2.

Referring to FIG. 4, the receiver 400 includes a receiving unit 410, a check unit 420, a decoder 430, a recovery unit 440, and a transmitting unit 405. The receiving unit 410 is configured to receive a data packet transmitted from a transmitter. The check unit 420 is configured to check control information contained in a header of the received data packet and field information contained in a mode field of a payload of the received data packet. The decoder 430 is configured to decode a plurality of frames included in the payload. The recovery unit 440 is configured to recover a frame lost in the decoded frames and recover the data transmitted from the transmitter. The transmitting unit 450 is configured to transmit reception information of the data packet corresponding to the lost frame, that is, loss information of the data packet to the transmitter.

More specifically, the receiving unit 410 receives a data packet transmitted from the transmitter, as described with reference to FIG. 3. That is, the receiving unit 410 receives a data packet containing data corresponding to a multimedia service. The data packet includes a header and a payload, and the payload includes a mode field and a plurality of frames containing the data.

The check unit 420 checks control information contained in the header, and checks field information contained in the mode field of the payload, that is, information on the plurality of frames included in the payload, for example, information indicating the number of frames and reception information of the data packet in the transmitter. That is, the check unit 420 checks the size of the payload, the number of frames, the lengths of the frames, and the start points of the frames in the payload through the information contained in the header and the information contained in the mode field.

The decoder 430 decodes the frames included in the payload based on the information checked by the check unit 420. The decoder 430 decodes a main frame in the frames included in the payload as described above. Then, when a lost sequence frame exists in the decoded main frame, the decoder 430 decodes a redundancy frame, and when a sequence frame is also lost in the decoded redundancy frame, the decoder 430 decodes an XOR frame. Furthermore, the decoded frames are inputted to a jitter buffer and a recovery buffer of the recovery unit 440.

The recovery unit 440 checks a sequence frame lost in the decoded main frame. When the lost sequence frame exists, the recovery unit 440 recovers the lost sequence frame from a sequence frame corresponding to the lost sequence frame in the decoded redundancy frame, and when a lost sequence frame also exists in the decoded redundancy frame, the recovery unit 440 recovers the lost sequence frame through the XOR frame, thereby recovering the data transmitted from the transmitter, that is, the data corresponding to the multimedia service.

The transmitting unit 450 transmits a data packet which the receiver 400 is to transmit to the transmitter. At this time, the transmitting unit 450 contains reception information of the data packet in the receiver 400, that is, a data packet loss in the receiver 400 and loss information of the data packet corresponding to recovery of the lost data packet into a mode field of a payload of the transmitted data packet, and then transmits the data packet to the transmitter. Since the structure of the data packet received from the transmitter, the structures of the frames included in the payload of the data packet, that is, the main frame, the redundancy frame, and the XOR frame, and the operation of the receiver 400 to receive the plurality of frames and the data packet have been described in detail with reference to FIGS. 1 and 2, the detailed descriptions thereof are omitted herein. Now, referring to FIG. 5, the operation of transmitting the above-described data packet in a communication system in accordance with the embodiment of the present invention will be described in detail.

Figure 5:
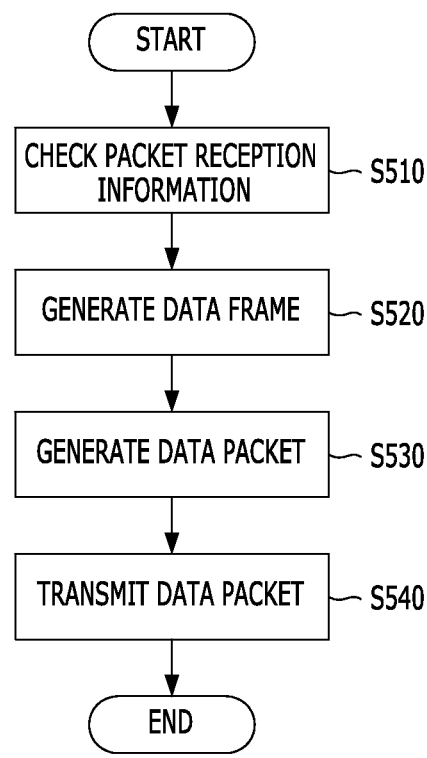
FIG. 5 is a flowchart showing a process in which a transmitter transmits a data packet in the communication system in accordance with the embodiment of the present invention.

FIG. 5 is a flowchart showing a process in which a transmitter transmits a data packet in the communication system in accordance with the embodiment of the present invention.

Referring to FIG. 5, the transmitter checks a data packet received from a receiver and reception information of a data packet in the receiver at step S510. The transmitter checks the reception information of the data packet in the receiver, that is, loss information of the data packet through a mode field included in a payload of the data packet received from the receiver.

At step S520, the transmitter generates a plurality of frames containing data to transmit to the receiver, that is, data corresponding to a multimedia service. At this time, the transmitter decides the number of frames and w by considering the loss information of the data packet in the receiver. According to the decided frame number and w, the transmitter generates a main frame and a redundancy frame or generates an XOR frame as well as the main frame and the redundancy frame.

At step S530, the transmitter includes the generated frames into a payload and generates a data packet. At this time, the transmitter contains information on the frames included in the payload, or particularly, information indicating the number of frames into the mode field of the payload. The payload of the data packet includes the main frame and the redundancy frame or includes the main frame, the redundancy frame, and the XOR frame according to the loss information of the data packet in the receiver.

At step S540, the transmitter transmits the generated data packet to the receiver. Since the structure of the data packet transmitted to the receiver, the structures of the frames included in the payload of the data packet, that is, the main frame, the redundancy frame, and the XOR frame, and the operation of generating and transmitting the plurality of frames and the data packet have been described above in detail, the detailed descriptions thereof are omitted herein. Now, referring to FIG. 6, the operation of receiving the above-described data packet in the communication system in accordance with the embodiment of the present invention will be described in more detail.

Figure 6:
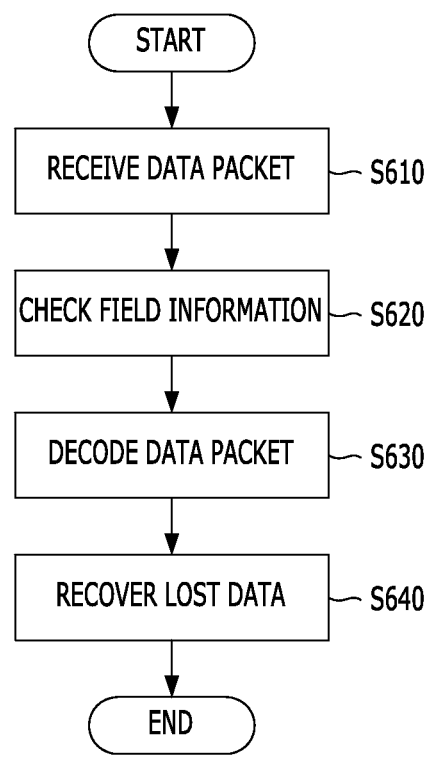
FIG. 6 is a flowchart schematically showing the process in which a receiver receives a data packet in the communication system in accordance with the embodiment of the present invention.

FIG. 6 is a flowchart schematically showing the process in which a receiver receives a data packet in the communication system in accordance with the embodiment of the present invention.

Referring to FIG. 6, the receiver receives a data packet transmitted from a transmitter, that is, a data packet containing data corresponding to a multimedia service at step S610. The data packet includes a header and a payload, and the payload includes a mode field and a plurality of frames containing the data.

At step S620, the receiver checks control information contained in the header of the data packet, and checks field information contained in the mode field of the payload, that is, information on a plurality of frames included in the payload, for example, information indicating the number of frames and reception information of the data packet in the transmitter. That is, the receiver checks the size of the payload, the number of frames, the lengths of the frames, and start points of the frames in the payload through the information contained in the header and the information contained in the mode field.

At step S630, the receiver decodes the frames included in the payload based on the checked information. Here, the receiver decodes a main frame in the frames included in the payload as described above. Then, when a lost sequence frame exists in the decoded main frame, the receiver decodes a redundancy frame, and when a lost sequence frame also exists in the decoded redundancy frame, the receiver decodes an XOR frame.

At step S640, the receiver checks a lost sequence frame in the decoded main frame. When the lost sequence frame exists, the receiver recovers the lost sequence frame from a sequence frame corresponding to the lost sequence frame in the decoded redundancy frame, and when the lost sequence frame is also lost in the decoded redundancy frame, the receiver recovers the lost sequence frame through the XOR frame, thereby recovering the data transmitted by the transmitter, that is, the data corresponding to the multimedia service.

Here, the receiver transmits the reception information of the data packet in the receiver, that is, the loss information of the data packet corresponding to the data packet loss in the receiver and the recovery of the lost data packet to the transmitter, when transmitting the data packet to the transmitter. At this time, the loss information of the data packet is contained in the mode field of the payload of the data packet transmitted to the transmitter. Furthermore, since the structure of the data packet received from the transmitter, the structures of the frames included in the payload of the data packet, that is, the main frame, the redundancy frame, and the XOR frame, and the operation of receiving the plurality of frames and the data packet have been described above in detail, the detailed descriptions thereof are omitted herein.

In the communication system in accordance with the embodiment of the present invention, a plurality of frames containing data corresponding to a multimedia service are transmitted/received as one data packet as described above. At this time, a main frame and a redundancy frame are included or the main frame, the redundancy frame, and an XOR frame are included in a payload of the data packet, depending on loss information of a data packet in the receiver. Information on the frames included in the payload, that is, information indicating the number of frames is contained in a mode field of the payload, and information on the payload is contained in a header of the data packet.

Furthermore, after the above-described data packet is received, a main frame is decoded from the frames included in the payload of the data packet. When a lost sequence frame exists in the decoded main frame, a redundancy frame is decoded, and when a lost sequence frame also exists in the decoded redundancy frame, an XOR frame is decoded. Then, a sequence frame lost in the decoded main frame is checked. When the lost sequence frame exists, the lost sequence frame is recovered from a sequence frame corresponding to the lost sequence frame in the decoded redundancy frame. When the lost sequence frame is also lost in the decoded redundancy frame, the lost sequence frame is recovered through the XOR frame. Accordingly, the data transmitted by the transmitter, that is, the data corresponding to the multimedia service is restored.

Figure 7:
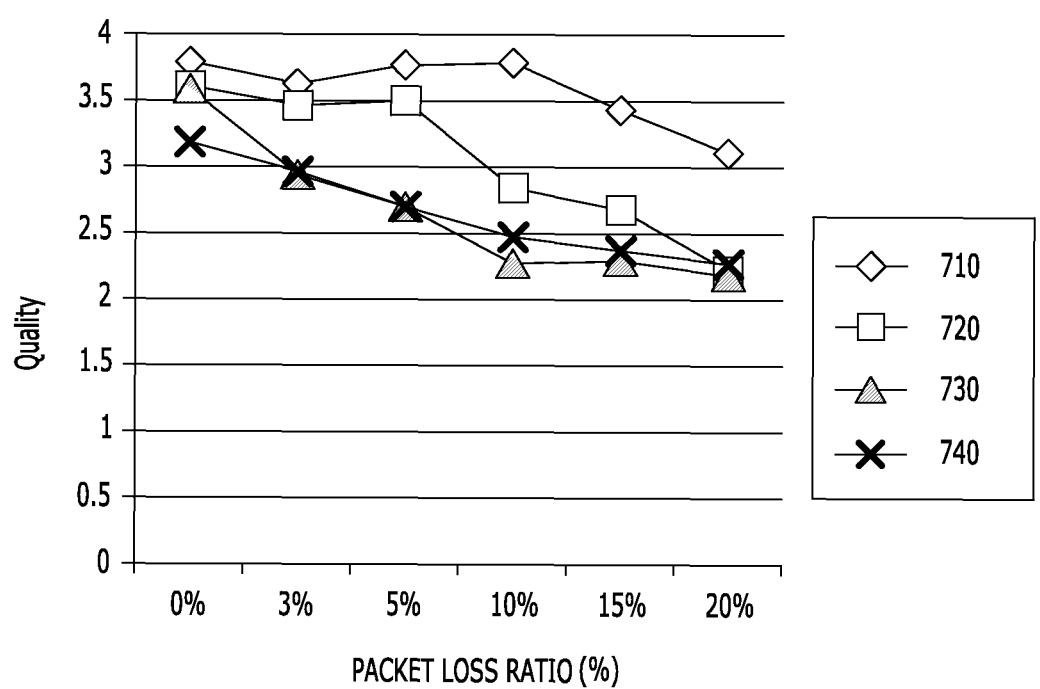
FIG. 7 schematically illustrates the performance result of the communication system in accordance with the embodiment of the present invention.

Accordingly, the packet loss ratio of the communication system in accordance with the embodiment of the present invention is significantly reduced, compared to existing communication systems using a method proposed to minimize a data loss, for example, a loss recovery method using a forward error correction code, a transmission control method through quality or loss feedback, or a congestion avoidance method. Therefore, the data transmission/reception performance of the communication system is improved. Accordingly, large-volume data may be normally transmitted/received. This will be described in more detail with reference to FIG. 7. Referring to FIG. 7, the transmission/reception performance of the communication system in accordance with the embodiment of the present invention has the highest service quality, that is, the highest QoS level at the same packet loss ratio, compared to transmission/reception performances 720, 730, and 740 of existing communication systems. Therefore, the communication system in accordance with the embodiment of the present invention may normally transmit/receive large-volume data having the higher QoS level than the existing communication systems. Furthermore, when transmitting/receiving the same data packets as the existing communication systems, the communication system has the lowest packet loss ratio. FIG. 7 schematically illustrates the performance result of the communication system in accordance with the embodiment of the present invention.

In accordance with the embodiments of the present invention, a loss of a data packet may be recovered by adding redundancy data to main data without a recovery delay time of a lost data packet of a multimedia service in a communication system, and a random or burst packet loss occurring through wired/wireless networks when media are transmitted between communication terminals may be recovered. According, when media are reproduced, a delay and loss may be reduced to increase a quality.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, comprising:
    a transmitting unit that transmits a first data packet to a receiver in the communication system;
    a receiving unit that receives reception information of the first packet from the receiver;
    a frame generation unit that checks the reception information received by the receiving unit to generate a plurality of frames containing data to transmit to the receiver, wherein the plurality of frames include a main frame including a plurality of main sequence frames corresponding to the data, and a redundancy frame of the main frame including a plurality of redundancy sequence frames corresponding to the plurality of main sequence frames;
    a packet generation unit that generates a second data packet to include a payload that includes the plurality of frames generated by the frame generation unit; and
    the transmitting unit that transmits the second data packet generated by the packet generation unit to the receiver,
    wherein the payload comprises the plurality of frames and a mode field,
    wherein the mode field contains information on the plurality of frames,
    wherein each main sequence frame of the plurality of main sequence frames corresponds with each redundancy sequence frame of the plurality of redundancy sequence frames, respectively,
    wherein the frame generation unit checks a loss ratio of the first data ticket through the reception information to generate the main frame, the redundancy frame of the main frame, and an XOR frame of the main frame, and
    wherein the frame generation unit generates the XOR frame including result frames by performing an XOR operation on a predetermined number of adjacent main sequence frames of the main frame, depending on the loss ratio.

2. The apparatus of claim 1, wherein the mode field comprises the reception information and information indicating the number of frames.

3. The apparatus of claim 2, wherein when the loss ratio is smaller than a threshold value, the packet generation unit generates the second data packet to include a payload that includes the main frame and the redundancy frame.

4. The apparatus of claim 2, wherein when the loss ratio is larger than a threshold value, the packet generation unit generates the second data packet to include a payload that includes the main frame, the redundancy frame, and the XOR frame.

5. The apparatus of claim 2, wherein the frame generation unit generates the redundancy frame by delaying a sequence of the main sequence frames of the main frame according to the loss ratio.

6. The apparatus of claim 5, wherein the mode field contains sequence delay information of the redundancy sequence frames in the redundancy frame.

7. An apparatus for receiving data in a communication system, the apparatus comprising:
    a receiving unit that receives a data packet from a transmitter;
    a check unit that checks control information contained in a header of the data packet received by the receiving unit and information on a plurality of frames included in a payload of the data packet received by the receiving unit, wherein the plurality of frames include a main frame including a plurality of main sequence frames corresponding to the data, and a redundancy frame of the main frame including a plurality of redundancy sequence frames corresponding to the plurality of main sequence frames;
    a decoder that decodes the plurality of frames included in the payload of the data packet received by the receiving unit;
    a recovery unit that recovers data transmitted by the transmitter through the decoded frames decoded by the decoder; and
    a transmitting unit that transmits reception information of the data packet to the transmitter,
    wherein the payload comprises a mode field containing information on the plurality of frames and the plurality of frames,
    wherein each main sequence frame of the plurality of main sequence frames corresponds with each redundancy sequence frame of the plurality of redundancy sequence frames, respectively,
    wherein the decoder decodes the main frame, and then decodes the redundancy frame of the main frame when a lost sequence frame exists in the main sequence frames of the decoded main frame,
    wherein when a redundancy sequence frame corresponding to the lost main sequence frame is lost in the decoded redundancy frame, the decoder decodes an XOR frame of the main frame, and
    wherein the recovery unit recovers the lost main sequence frame by performing an XOR operation on an XOR operation result frame corresponding to the lost main sequence frame in the decoded XOR frame and sequence frames adjacent to the lost main sequence frame in the decoded main frame.

8. The apparatus of claim 7, wherein the mode field comprises the reception information and information indicating the number of frames.

9. The apparatus of claim 8, wherein the check unit checks a size of the payload, lengths of the respective frames, and start points of the respective frames in the payload, through the header and the mode field.

10. The apparatus of claim 8, wherein the recovery unit recovers the lost main sequence frame from a redundancy sequence frame corresponding to the lost main sequence frame in the decoded redundancy frame.

11. A method for transmitting/receiving data in a communication system, the method comprising:
   transmitting a first data packet to a receiver in the communication system;
   receiving reception information of the first data packet from the receiver;
   generating a plurality of frames containing data to transmit to the receiver by considering the reception information and then generating a second data packet that includes a header and a payload, wherein the payload includes the plurality of frames, wherein the plurality of frames include a main frame including a plurality of main sequence frames corresponding to the data, and a redundancy frame of the main frame including a plurality of redundancy sequence frames corresponding to the plurality of main sequence frames; and
   transmitting the second data packet to the receiver,
   wherein the payload comprises the plurality of frames and a mode field,
   wherein the mode field contains information on the plurality of frames,
   wherein the mode field comprises the reception information and information indicating the number of frames,
   wherein each main sequence frame of the plurality of main sequence frames corresponds with each redundancy sequence frame of the plurality of redundancy sequence frames, respectively, and
   wherein said generating the plurality of frames containing data to transmit to the receiver by considering the reception information and then generating the second data packet that includes the header and the payload, wherein the payload includes the plurality of frames comprises:
      checking a loss ratio of the first data packet through the reception information, and generating the main frame;
      generating the redundancy frame by delaying a sequence of the main sequence frames of the main frame, depending on the loss ratio; and
      generating an XOR frame including result frames by performing an XOR operation on a predetermined number of adjacent main sequence frames in the main sequence frames of the main frame, depending on the loss ratio.

12. The method of claim 11, wherein in said generating the plurality of frames containing data to transmit to the receiver by considering the reception information and then generating the second data packet that includes the header and the payload, wherein the payload includes the plurality of frames,
   when the loss ratio is smaller than a threshold value, the main frame and the redundancy frame are included in the payload to generate the second data packet, and
   when the loss ratio is larger than the threshold value, the main frame, the redundancy frame, and the XOR frame are included into the payload to generate the second data packet.

13. A method for transmitting/receiving data in a communication system, the method comprising:
   transmitting a first data packet to a receiver in the communication system;
   receiving reception information of the first data packet from the receiver;
   generating a plurality of frames containing data to transmit to the receiver by considering the reception information and then generating a second data packet that includes a header and a payload, wherein the payload includes the plurality of frames, and wherein the plurality of frames include a main frame including a plurality of main sequence frames corresponding to the data, and a redundancy frame of the main frame including a plurality of redundancy sequence frames corresponding to the plurality of main sequence frames;
   transmitting the second data packet to the receiver;
   decoding a main frame including a plurality of main sequence frames corresponding to the data in the plurality of frames;
   when a lost sequence frame exists in the main sequence frames of the decoded main frame, decoding a redundancy frame of the main frame in the plurality of frames; and
   when a redundancy sequence frame corresponding to the lost main sequence frame is lost in the decoded redundancy frame, decoding an XOR frame of the main frame,
   wherein the payload comprises the plurality of frames and a mode field,
   wherein the mode field contains information on the plurality of frames, and
   wherein the mode field comprises the reception information and information indicating the number of frames.

14. The method of claim 13, further comprising:
   recovering the lost sequence frame from a redundancy sequence frame corresponding to the lost main sequence frame in the decoded redundancy frame; and
   recovering the lost main sequence frame by performing an XOR operation on an XOR operation result frame corresponding to the lost main sequence frame in the decoded XOR frame and main sequence frames adjacent to the lost sequence frame in the decoded main frame.

* * * * *